(12) United States Patent
Eberle et al.

(10) Patent No.: US 6,595,580 B2
(45) Date of Patent: Jul. 22, 2003

(54) RECEIVING DEVICE FOR A PNEUMATIC SPRING ARRANGEMENT HAVING SWIVELLABLE HINGED LEVERS IN A BODY STRUCTURE OF A MOTOR VEHICLE AND METHOD FOR MAKING A RECEIVING DEVICE

(75) Inventors: Wilfried Eberle, Ehingen (DE); Ruediger Jahn, Leonberg (DE); Patrick Polzer, Muehlacker (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/153,886

(22) Filed: May 24, 2002

(65) Prior Publication Data
US 2002/0195841 A1 Dec. 26, 2002

(30) Foreign Application Priority Data
May 25, 2001 (DE) .......................... 101 25 477

(51) Int. Cl.[7] .............. B60J 5/10; B60J 1/18; B62D 25/12
(52) U.S. Cl. ............ 296/203.04; 276/195; 276/202; 276/56; 276/146.2; 276/146.8; 276/146.11
(58) Field of Search ............ 296/203.04, 195, 296/201, 202, 50, 56, 146.1, 147, 149, 146.2, 146.8, 146.11

(56) References Cited

U.S. PATENT DOCUMENTS 6,137,249 A * 10/2000 Butler et al. ............... 296/107
6,283,535 B1 * 9/2001 Yuge ......................... 296/146.8
6,382,706 B2 * 5/2002 Yuge et al. ................ 296/146.4
2001/0008057 A1 * 7/2001 Sakaue et al. ............ 296/146.8
2001/0013713 A1 * 8/2001 Holt ........................ 296/146.11
2002/0005650 A1 * 1/2002 Rogers, Jr. et al. ............ 296/56
2002/0032986 A1 * 3/2002 Yuge ............................ 296/56

FOREIGN PATENT DOCUMENTS

| DE | 2744927 |   | 4/1979 |   |
|----|---------|---|--------|---|
| DE | 19933765 |   | 1/2001 |   |
| JP | 63-159131 | * | 7/1988 | ............ 296/146.6 |
| JP | 6-191439 | * | 7/1994 | .............. 296/195 |

* cited by examiner

Primary Examiner—D. Glenn Dayoan
Assistant Examiner—H. Gutman
(74) Attorney, Agent, or Firm—Crowell & Moring LLP

(57) ABSTRACT

A receiving device for receiving a pneumatic spring arrangement includes a container, a bearing support, a stationary supporting frame, and an end connection plate. The pneumatic spring arrangement has pneumatic springs, each of which is connected to a swivellable hinged lever in a body structure of a motor vehicle. The container is embedded in the body structure of the vehicle, and the pneumatic springs and the hinged levers connected to the pneumatic springs are disposed in the container. The bearing support is swivellably attached to the hinged levers. The stationary supporting frame is disposed in the container, and the bearing support is connected to the stationary supporting frame. The end connection plate is adapted to and fastened to the body structure, wherein the end connection plate is connected to a top side of the container.

23 Claims, 5 Drawing Sheets

A Pneumatic Spring Arrangement Having Swivellable Hinged Levers in a Body Structure of a Motor Vehicle and Method for Making a Receiving Device

RECEIVING DEVICE FOR A PNEUMATIC SPRING ARRANGEMENT HAVING SWIVELLABLE HINGED LEVERS IN A BODY STRUCTURE OF A MOTOR VEHICLE AND METHOD FOR MAKING A RECEIVING DEVICE

This application claims the priority of Federal Republic of Germany Patent Document No. 101 25 477.6, filed May 25, 2001.

BACKGROUND AND SUMMARY OF THE INVENTION

The invention relates to a receiving device and a method of making a receiving device.

German Patent Document DE 27 44 927 A1 discloses a tail gate of a motor vehicle which can be swivelled upward and has movable hinged levers and a pneumatic spring connected to the hinged levers. The pneumatic spring is arranged in a receiving device in a cavity created by the exterior roof frame and a rear pillar and the roof. A hinged lever is detachably fastened on a rear-side flange connected with the roof and the receiving device.

It is an object of the invention to provide, in a body structure of a motor vehicle, an improved receiving device for a pneumatic spring arrangement connected with swivellable hinged levers, which is easy to mount and can be inserted as a unit into the body structure of the vehicle.

This object is achieved by a receiving device according to the present invention.

The principal advantages achieved by the invention are that the receiving device in a body structure of the vehicle includes a preassembled constructional unit and includes, for example, the container with a closing-off end connection plate as the lid, and mounted pneumatic springs in the container. For this purpose, the pneumatic springs as well as the hinged levers connected with the pneumatic springs, are arranged in a container imbedded in the body structure of the vehicle and are swivellably held on a bearing support which can be connected with a stationary supporting frame in the container. On the top side, this container is closed off by an end connection plate whose shape is adapted to the body structure and which can be fixedly connected with the body structure.

In order to have a precise bearing of the pneumatic springs and of the hinged levers in the container, the supporting frame is arranged between side walls of the container on the face-side, and the bearing support with fastening legs that are bent at right angles is placed in front of this frame from the outside. In addition, a wall of the closing lid or of a support is arranged between the bearing support and the supporting frame, which wall is penetrated by fastening screws fastenable to the supporting frame by means of nuts.

For the fitting-through and mounting of the hinged levers for the tail gate in the container and for the connection with the pneumatic springs, the supporting frame has a through-opening for the hinged levers. In the through-opening, a bearing bridge of the bearing support is partially arranged which receives the swivel bearings for the hinged levers of the pneumatic springs. At the free ends, the bearing bridge has fastening legs bent at right angles, which fastening legs are arranged in front of the supporting frame and rest on the exterior side on a wall of the end connection plate. The bearing bridge with the swivel bearings extend on the interior side of the supporting frame in the transverse direction between the side walls of the container.

For the stable arrangement of the bearing support on the container in the body structure, the container is closed off on the forward side by the supporting frame which, resting against the side walls and the floor of the container, is fixedly connected with the walls and the floor. Furthermore, the container has a leg tilted away from the side walls, which leg can be connected with the body structure or the end connection plate.

In the floor of the container and in a corresponding wall of the body structure or of a support, one mounting opening respectively is provided for the pneumatic springs, this opening being closable by a lid.

For the discharge of water collecting in the container, a water discharge groove is provided in the floor of the container. The water discharge groove has, for example, a shaped-out section in the floor and which leads into a channel of the body structure. This water discharge groove extends preferably below the supporting frame so that an interconnection is ensured from the interior of the container to the outside.

Other objects, advantages and novel features of the present invention will become apparent from the following detailed description of the invention when considered in conjunction with the accompanying drawings.

DETAILED DESCRIPTION OF THE DRAWINGS

Figure 1:
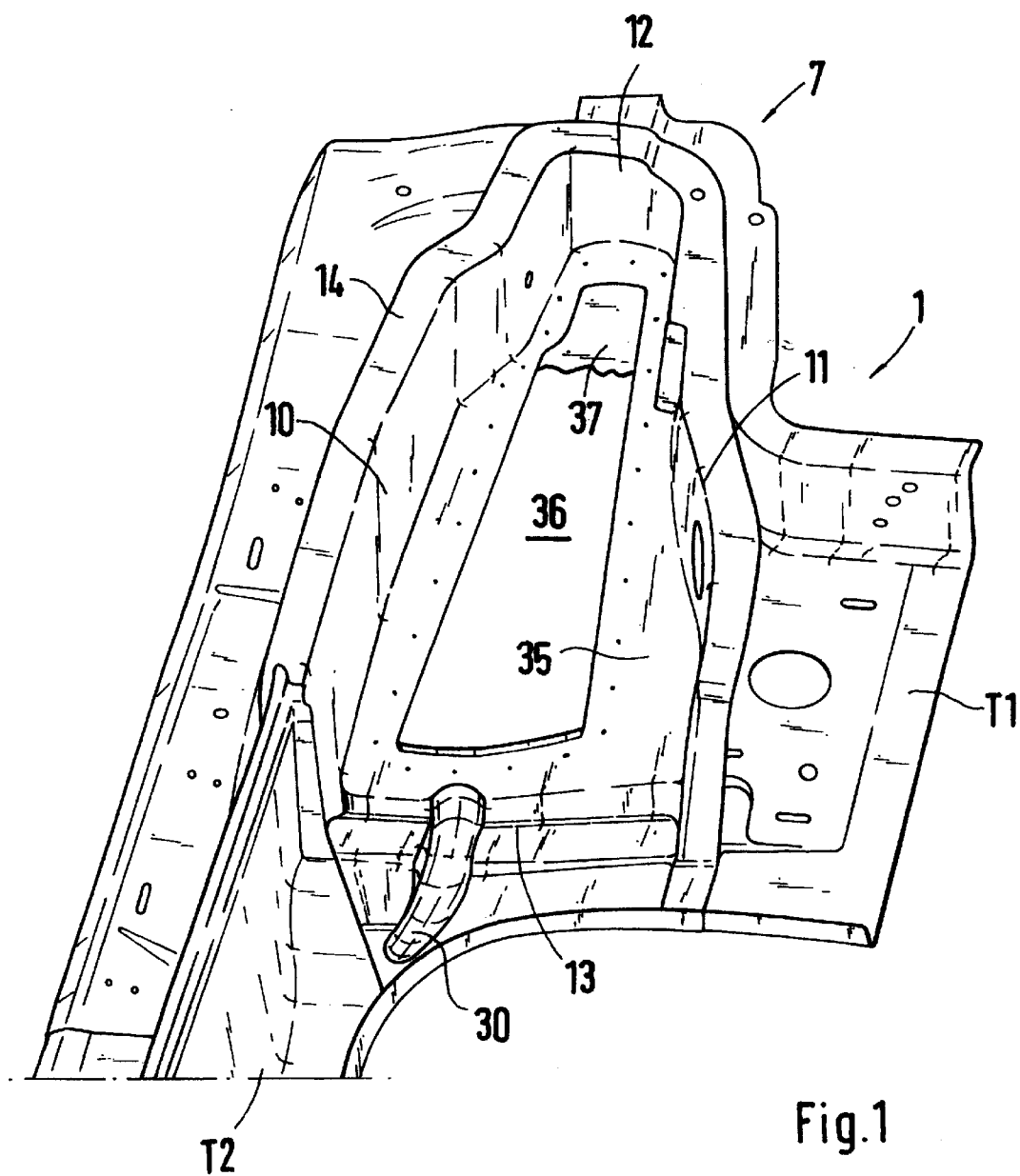
FIG. 1 is a diagrammatic representation of a container of the receiving device in a body structure of a motor vehicle.
Figure 2:
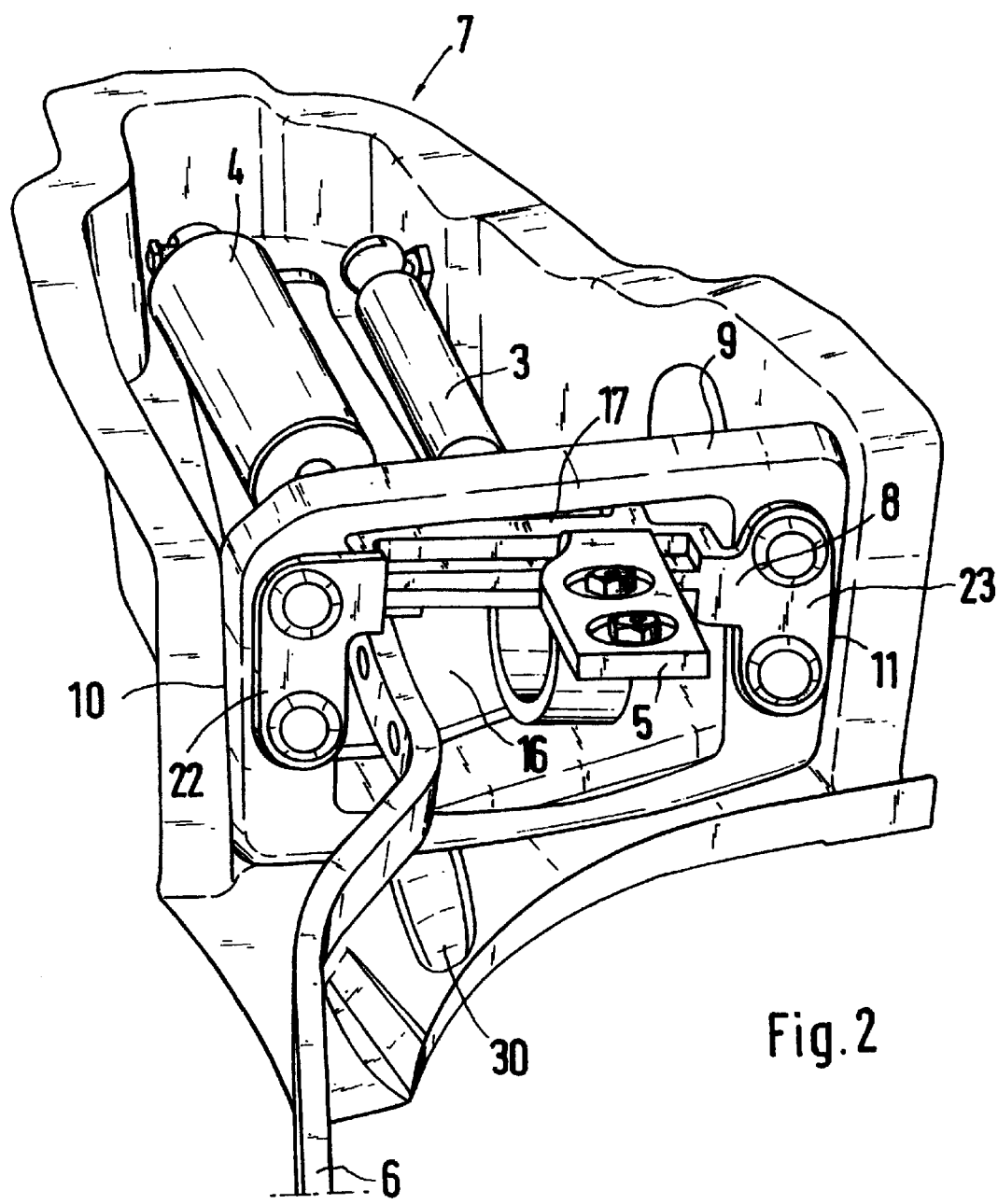
FIG. 2 is a diagrammatic view of a receiving device with the container and interior pneumatic springs, hinged levers as well as a bearing support and a supporting frame.
Figure 3:
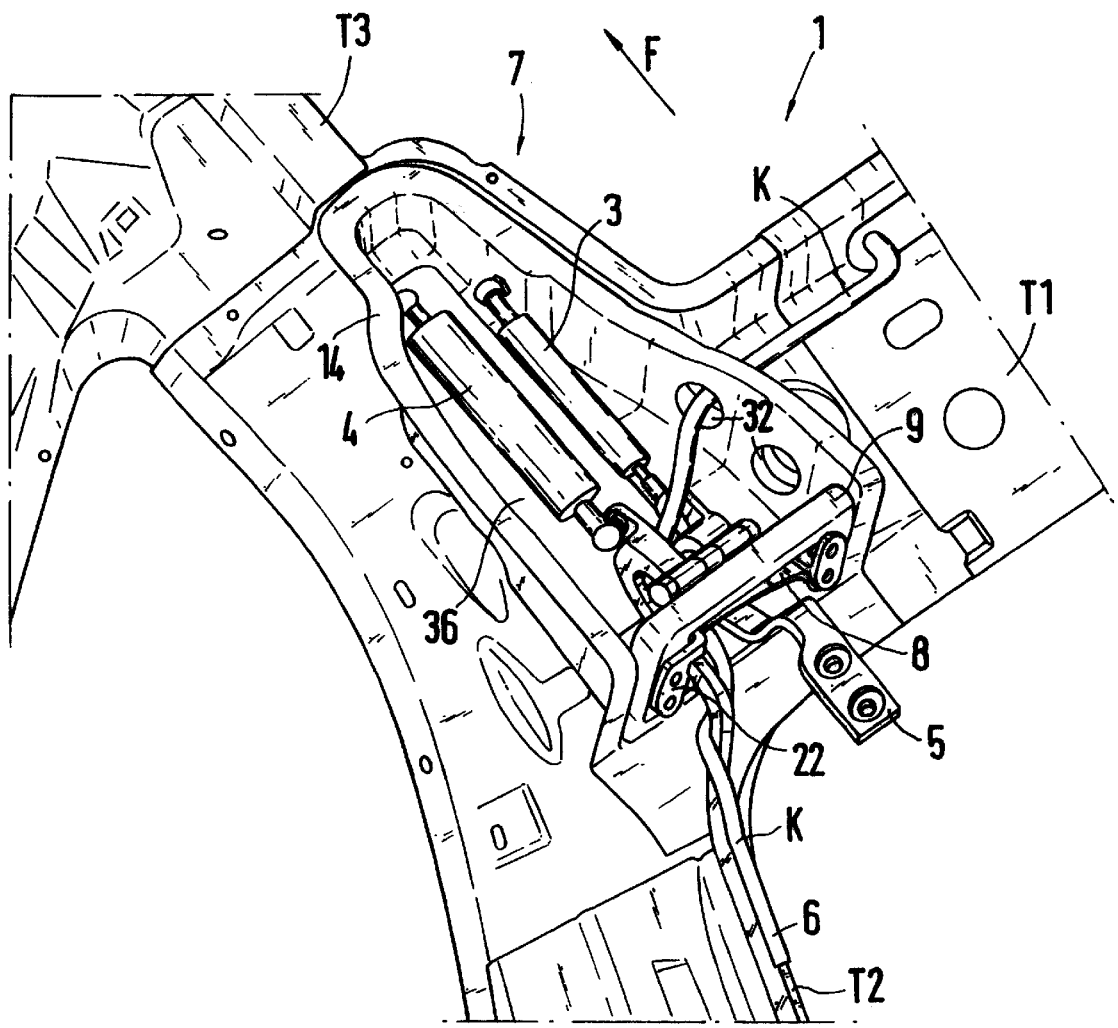
FIG. 3 is a diagrammatic top view and a view in the driving direction F of the vehicle.
Figure 4:
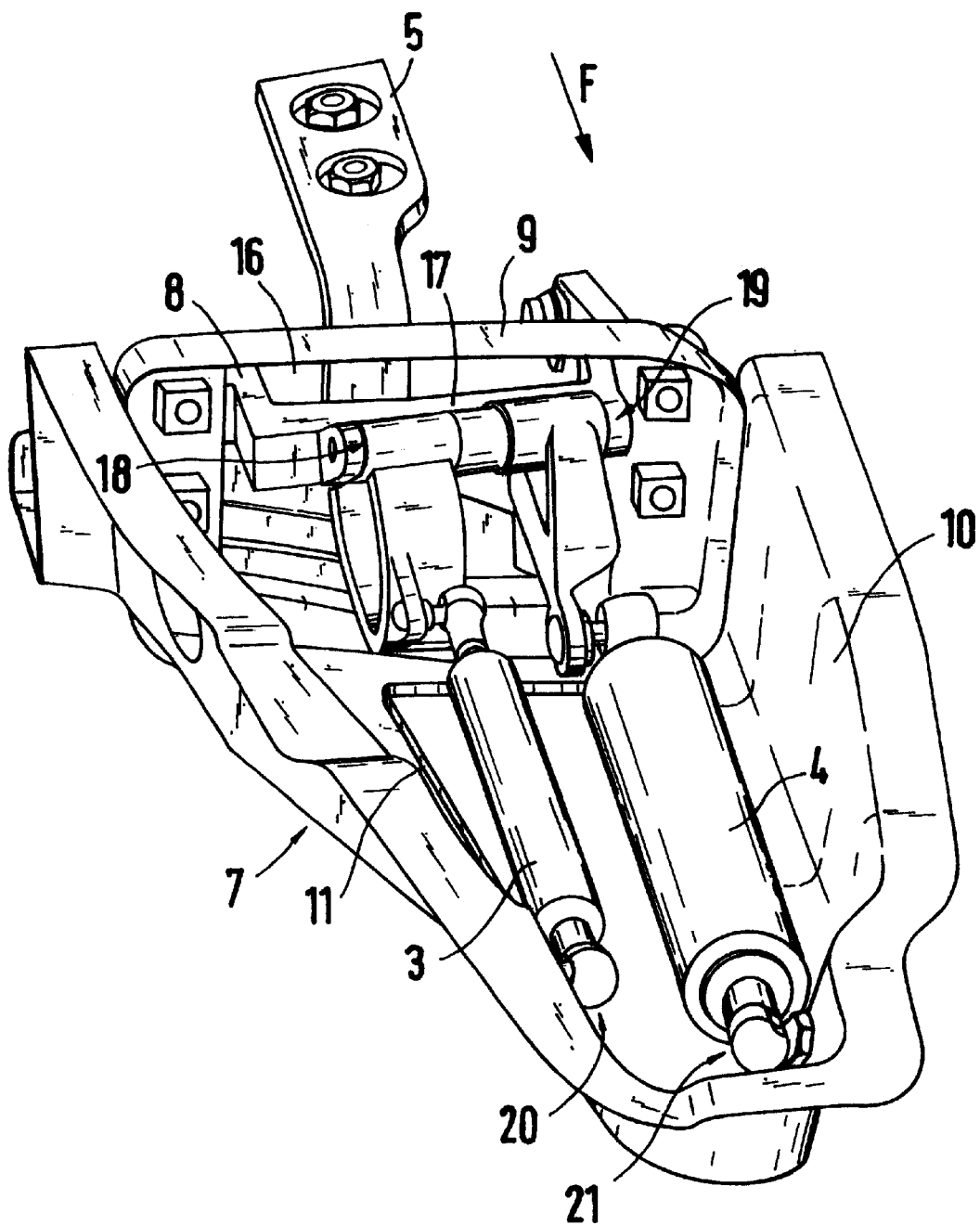
FIG. 4 is a diagrammatic view of the receiving device from the rear and against the driving direction F of the vehicle.

As shown in FIGS. 1–5, the receiving device 4 comprises a container 7 embedded in a body structure 1 comprising several supports T1, T2, T3. In the container 7, as shown in FIG. 2, pneumatic springs 3, 4 are arranged and are connected with hinged levers 5, 6. As shown in FIG. 4, these hinged levers 5, 6 are held in the bearings 18, 19 of a bearing support 8 which, in turn, can be connected with a supporting frame 9 on a support or an end connection plate 15 (shown in FIG. 5) which is held on the body structure 1.

As shown in FIG. 1, the container 7 includes an oblong trough which has laterally surrounding walls 10, 11 and a rear-side end wall 12 as well as a forward-side opening 13 for receiving the supporting frame 9. The surrounding walls preferably have a continuous side extension 14 for fastening the end connection plate 15 as a lid.

In the floor 35 of the container 7, a mounting opening 36 is provided and a corresponding opening is made in the support T1. These openings can be closed off by a lid 37.

As shown in FIGS. 2, 3 and 4, the supporting frame 9 is arranged transversely and is fixedly connected with the side walls 10, 11 as well as with the floor 35 and closes off the face of the container 7. Furthermore, the supporting frame 9 has a through-opening 16 through which the hinged levers 5, 6 are guided to the pneumatic springs 3, 4. As shown in FIGS. 2 and 4, these hinged levers 5, 6 are attached to a bearing bridge 17 of the bearing support 8 in the swivel bearings 18, 19. Furthermore, as shown in FIGS. 3 and 4, the pneumatic springs 3, 4 are connected with the levers 5 and 6 and are attached to the side walls 10, 11 by means of their ends 20, 21 which face away. For reinforcing these bearing areas for the pneumatic springs 3, 4, a reinforcing part or a reinforcing plate is connected with the walls 10, 11.

As shown in FIG. 2, the bearing support 8 has fastening legs 22, 23 bent at right angles, and the fastening legs 22, 23 extend toward the outside through the opening 16 of the supporting frame 9. The bearing bridge 17 on the other side is situated with the supporting frame 9 in the interior of the container 7.

In the floor 35 of the container 7, as shown in FIG. 1, a water discharge groove 30 is situated on the open face, which water discharge groove extends through below the supporting frame 9 and guides the water out of the container 7 toward the outside into a drain of the vehicle body. The water discharge groove 30 is further developed as an indentation in the floor 35.

Openings 32 for the electric cables K are provided in the walls 10, 11 of the container 7.

Figure 5:
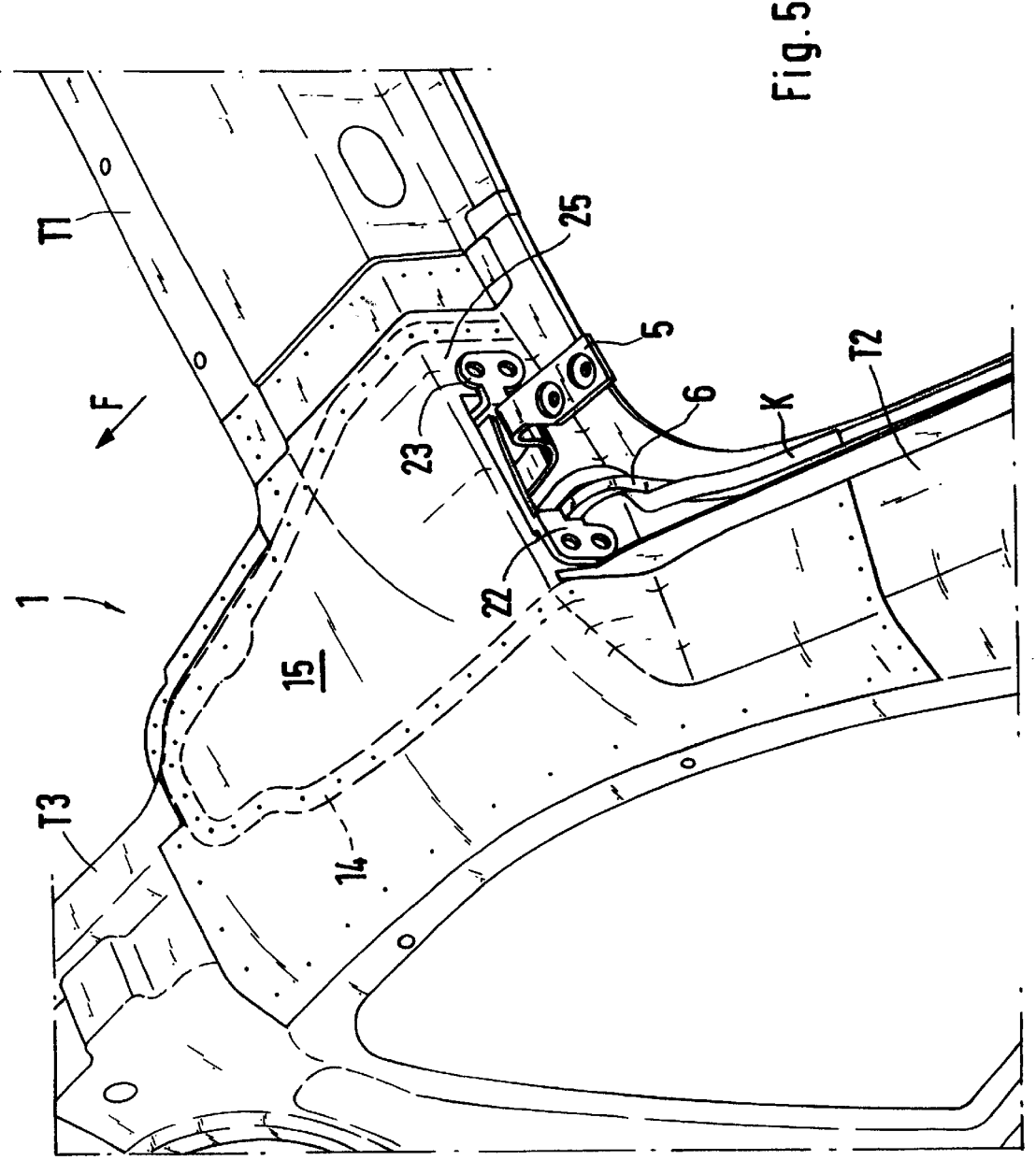
FIG. 5 is a view of the body structure with the closed container in the driving direction F.

As shown in FIGS. 3 and 5, for the fastening of the container 7 to the body structure 1 and to the supports T1, T2, T3 respectively, the supporting frame 9 rests on an interior side of an end wall 25 of the end connection plate 15. The fastening legs 22, 23 of the bearing support 8 reach from the outside over the end wall 25. By means of screws, which can be screwed and fixed in nuts fastened on the supporting frame 9, a connection takes place with the vehicle body structure 1. Subsequently, the end connection plate 15 is fastened with the supports T1, T2, T3 by means of point welding. The floor 35 of the container 7 is also connected by means of point weldings with the vehicle body structure 1 and the corresponding supports respectively.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Receiving device for containing a pneumatic spring arrangement having pneumatic springs, comprising: swivellable hinged levers in a body structure of a motor vehicle for the swivelling of a tail gate as well as a window part of the tail gate, wherein the pneumatic spring connected with the hinged levers and the hinged levers are arranged in a container embedded in the body structure of the vehicle and are swivellably held on a bearing support in swivel bearings, wherein said bearing support can be connected with a stationary supporting frame in the container, a top side of which is connected with an end connection plate which is adapted to the body structure and fastened thereto.

2. Receiving device according to claim 1, wherein the supporting frame is arranged between side walls of the container on a face side, and the bearing support with fastening legs bent at right angles is placed in front of the supporting frame from outside of the receiving device, and, between the bearing support and the supporting frame, a wall of the end connection plate is arranged which is penetrated by fastening screws which can be fastened to the supporting frame in nuts.

3. Receiving device according to claim 1, wherein the supporting frame has a through-opening for receiving the hinged levers, in said through-opening, a bearing bridge of the bearing support being partially arranged, said bearing bridge accommodates the swivel bearings of the hinged levers.

4. Receiving device according to claim 3, wherein, at free ends, the bearing bridge has fastening legs bent at right angles which are arranged in front of the supporting frame and rest on the outside against a wall of the end connection plate, the bearing bridge with the swivel bearings extending approximately on an the interior side of the supporting frame in the transverse direction between side walls of the container.

5. Receiving device according to claim 4, wherein, by means of ends of the pneumatic springs facing away from the hinged levers, the pneumatic springs are disposed on the side walls of the container and extend in an exposed manner to the swivel bearings on the bearing bridge.

6. Receiving device according to claim 5, wherein the container is closed off on a front side approximately flush by the supporting frame which, resting on the side walls and on a floor of the container, is fixedly connected with the side walls and the floor.

7. Receiving device according to claim 6, wherein the container has a surrounding leg extending from the side walls of the container, wherein said surrounding leg can be connected with at least one wall of the body structure or with the end connection plate.

8. Receiving device according to claim 6, wherein the container has one mounting opening respectively for the pneumatic springs in the floor of the container and in an opposite corresponding wall of the body structure, wherein said mounting opening can be closed off by a lid.

9. Receiving device according to claim 8, wherein a water discharge groove, which is shaped out toward the outside of the container is provided below the supporting frame in the floor of the container, wherein said water discharge groove leads into a channel of the vehicle body structure.

10. Receiving device according to claim 2, wherein the container is connected with the supporting frame and the end connection plate and can be inserted as a constructional unit into the vehicle body structure and in supports respectively and can be connected with the supports.

11. Receiving device according to claim 1, wherein openings for receiving electric cables are provided in walls of the container.

12. A receiving device for receiving a pneumatic spring arrangement having pneumatic springs, each of which is connected to a swivellable hinged lever in a body structure of a motor vehicle, the receiving device comprising:
a container embedded in the body structure of the vehicle, the pneumatic springs and the hinged levers connected to the pneumatic springs being disposed in the container;
a bearing support, the hinged levers being swivellably attached to the bearing support;
a stationary supporting frame disposed in the container, the bearing support being connected to the stationary supporting frame; and
an end connection plate adapted to and fastened to the body structure, wherein the end connection plate is connected to a top side of the container.

13. The receiving device according to claim 12, wherein the supporting frame is disposed between side walls of the container on a face side, and the bearing support has fastening legs that are bent at right angles, the bearing support being placed in front of the supporting frame from outside of the receiving device, and wherein the end connection plate has a wall that is disposed between the bearing support and the supporting frame, the wall being attached to the supporting frame.

14. The receiving device according to claim 12, wherein the supporting frame has a through-opening for receiving the hinged levers, wherein the bearing support has a bearing bridge disposed in the through-opening of the supporting frame, and wherein the hinged levers have swivel bearings for swivellably connecting the hinged levers to the bearing bridge.

15. The receiving device according to claim 14, wherein the bearing bridge has free ends and has a fastening leg at each of the free ends, the fastening legs being bent at right angles which are arranged in front of the supporting frame and rest against a wall of the end connection plate outside of the container, the bearing bridge extending approximately on an interior side of the supporting frame in a transverse direction between side walls of the container.

16. The receiving device according to claim 15, wherein each of the pneumatic springs has a free end that is attached on one of the side walls of the container, and the pneumatic springs extend in an exposed manner to the swivel bearings.

17. The receiving device according to claim 12, wherein a front side of the container is closed off approximately flush by the supporting frame, the supporting frame being fixedly connected to side walls and a floor of the container.

18. The receiving device according to claim 17, wherein the container has a surrounding leg extending from the side walls of the container, wherein said surrounding leg can be connected with at least one wall of the body structure or with the end connection plate.

19. The receiving device according to claim 18, wherein the container has a mounting opening in the floor of the container, wherein said mounting opening can be closed off by a lid.

20. The receiving device according to claim 19, wherein the container has a water discharge groove below the supporting frame in the floor of the container, wherein said water discharge groove leads into a channel of the vehicle body structure.

21. The receiving device according to claim 12, wherein the container is connected with the supporting frame and the end connection plate and is insertable as a unit into the vehicle body structure.

22. A method for making a receiving device for receiving a pneumatic spring arrangement having pneumatic springs, each of which is connected to a swivellable hinged lever in a body structure of a motor vehicle, the method comprising:
    embedding a container in the body structure of the vehicle for containing the pneumatic springs and the hinged levers connected to the pneumatic springs;
    swivellably attaching a bearing support to the hinged levers;
    disposing a stationary supporting frame in the container and connecting the stationary supporting frame to the bearing support; and
    adapting and fastening an end connection plate to the body structure and to a top side of the container.

23. The method according to claim 22, further comprising:
    placing the hinged levers through a through-opening of the supporting frame;
    disposing a bearing bridge of the bearing support in the through-opening of the supporting frame; and
    swivellably connecting the hinged levers to the bearing bridge using swivel bearings of the hinged levers.

* * * * *